US 6,612,055 B2

(12) United States Patent
Bradford

(10) Patent No.: US 6,612,055 B2
(45) Date of Patent: Sep. 2, 2003

(54) SIGN PANEL USING AMBIENT OR ARTIFICIAL LIGHT

(75) Inventor: Tracy W. Bradford, Catawba Island Township, OH (US)

(73) Assignee: World Lit Corporaion, Port Clinton, OH (US)

( * ) Notice: Subject to any disclaimer, the term of this patent is extended or adjusted under 35 U.S.C. 154(b) by 0 days.

(21) Appl. No.: 09/999,899

(22) Filed: Oct. 23, 2001

(65) Prior Publication Data

US 2003/0074818 A1 Apr. 24, 2003

(51) Int. Cl.⁷ .............................................. G09F 13/18
(52) U.S. Cl. .......................................... 40/546; 40/541
(58) Field of Search ......................... 40/546, 541, 582

(56) References Cited

U.S. PATENT DOCUMENTS

| | | |
|---|---|---|
| 1,525,107 A | 2/1925 | Spencer |
| 1,592,398 A | 7/1926 | Van Bloem |
| 1,725,206 A | 8/1929 | Petersen |
| 1,887,523 A | 11/1932 | Schenkel |
| 2,071,239 A | 2/1937 | Spencer |
| 2,810,225 A | 10/1957 | Hardesty |
| 3,226,865 A | 1/1966 | Brand |
| 3,578,538 A | 5/1971 | Prosser |
| 3,968,584 A | 7/1976 | Kingston |
| 4,424,449 A | 1/1984 | O'Brill |
| 4,729,185 A | 3/1988 | Baba |
| 4,888,893 A | 12/1989 | Jones |
| 5,009,019 A | 4/1991 | Erlendsson |
| 5,177,889 A * | 1/1993 | Ching Hwei ................ 40/204 |
| 5,536,558 A | 7/1996 | Shelton |
| 5,682,697 A | 11/1997 | Hjaltason |
| 5,842,297 A * | 12/1998 | Tung ............................ 40/546 |
| 5,965,221 A | 10/1999 | Messenger |

* cited by examiner

Primary Examiner—Cassandra H. Davis
(74) Attorney, Agent, or Firm—Porter, Wright, Morris & Arthur, LLP

(57) ABSTRACT

A unitary sign panel including a transparent, preferably phosphorescent, plastic sheet having opposed forward and rearward planar surface and grooves in the rearward planar surface of the sheet to form outlines of desired indicia viewable from the forward planar surface of the sheet. Additional grooves are provided in the rearward planar surface forming hatch patterns within the outlines of the selected indicia which are also viewable from the forward planar surface of the sheet. The additional grooves preferably have a depth less than a depth of the grooves. The unitary sign panel is free of materials at the forward and rearward surfaces of the sheet such that light is transferable through the sheet in a direction perpendicular to the forward and rearward planar surfaces of the sheet. The sheet has a thickness sufficient for viewing through the sheet in the direction perpendicular to the forward and rearward planar surfaces of the sheet so that a viewer can see objects on the other side of the sign panel. The grooves and the additional grooves are preferably each V-shaped in cross-section. The grooves are preferably formed by engraving so that the sheet is substantially translucent at the grooves and is opaque at an apex of the V-shaped grooves. The sign panel can utilize ambient light or can be provided with an artificial light source disposed at an edge of the sheet.

21 Claims, 5 Drawing Sheets

SIGN PANEL USING AMBIENT OR ARTIFICIAL LIGHT

FIELD OF THE INVENTION

The present invention generally relates to signs and, more particularly, to signs which produce lighting effects.

BACKGROUND OF THE INVENTION

Various types of signs are utilized to convey information. These signs preferably are illuminated or have some type of lighting effect so that they draw the attention of desired viewers. Certainly any sign with some special eye appeal has an advantage over the competition.

One popular type of sign is a "neon sign" which utilizes active electrical lighting in the form of neon tubes. The neon tubes are sealed tubes filled with neon gas which discharges visible energy when excited by electrical energy provided by a power supply. The neon tubes provide bright and variable color which is very appealing. While neon signs are visually appealing, they have a number of disadvantages. Neon signs can be very expensive to produce and have limitations on the complexity of the alphanumeric and graphic images which can be produced by the neon tubes. Additionally, the active lighting requires considerable electrical power. Moreover, such active electrical lighting is banned or closely controlled in many locations.

Another popular type of sign is a passive sign which utilizes ambient light to create a lighting effect which draws attention and is visually appealing. For example, U.S. Pat. No. 5,536,558 discloses an illuminated display using ambient light, the disclosure of which is expressly incorporated herein in its entirety by reference. The display is constructed from translucent fluorescent plastic sheet sufficient to form a light conduit and an opaque reflective coating provided on one side of the sheet. Grooves are formed in the sheet through the opaque reflective coating which intercept light transmitted through the plane of the sheet to provide refraction of the captured light and illuminate the pattern of the grooves. While such signs eliminate the need for electricity and may be visually appealing under some conditions, they have a number of disadvantages. The source of ambient light must be provided from an appropriate direction to obtain the desired lighting effect. For example, virtually no lighting effect is obtained if the ambient light is directed toward the grooved side of the display. Additionally, the displays cannot be utilized in storefront windows in locations where codes require signs to be substantially transparent so that law enforcement officers may view the interior of the store through the signs in the event of an emergency or other traumatic event. Moreover, owing to the complexity of materials, graphic registration and process steps and equipment required for their manufacture, the displays are relatively expensive to produce.

Accordingly, there is a need in the art for an improved sign which is visually appealing, draws attention, is relatively inexpensive to produce, can be utilized without electricity, and/or is substantially transparent.

SUMMARY OF THE INVENTION

The present invention provides a sign panel which overcomes at least some of the above-noted problems of the related art. According to the present invention, a sign panel comprises, in combination, a transparent, preferably phosphorescent, plastic sheet having opposed forward and rearward planar surfaces and grooves in the rearward planar surface of the sheet to form outlines of desired indicia viewable at the forward planar surface of the sheet. The forward and rearward surfaces of the sheet are free of opaque materials such that light is transferable through the sheet in a direction perpendicular to the forward and rearward planar surfaces of the sheet.

According to another aspect of the present invention a sign panel comprises, in combination, a transparent sheet having opposed forward and rearward planar surfaces and grooves in the rearward planar surface of the sheet to form outlines of desired indicia viewable from the forward planar surface of the sheet. Additional grooves are provided in the rearward planar surface to form hatch patterns within the outlines of the selected indicia.

According to yet another aspect of the present invention a unitary sign panel comprises, in combination, a transparent phosphorescent plastic or other substantially transparent plastic sheet having opposed forward and rearward planar surfaces and grooves in the rearward planar surface of the sheet to form outlines of desired indicia viewable from the forward planar surface of the sheet. Additional grooves are provided in the rearward planar surface to form hatch patterns within the outlines of the selected indicia. The unitary sign panel is free of materials at the forward and rearward surfaces of the sheet such that light is transferable through the sheet in a direction perpendicular to the forward and rearward planar surfaces of the sheet. The sheet has a thickness sufficient for viewing through the sheet in the direction perpendicular to the forward and rearward planar surfaces of the sheet. The grooves and the additional grooves are each V-shaped in cross-section.

BRIEF DESCRIPTION OF THE DRAWINGS

These and further features of the present invention will be apparent with reference to the following description and drawings, wherein.

Figure 1:
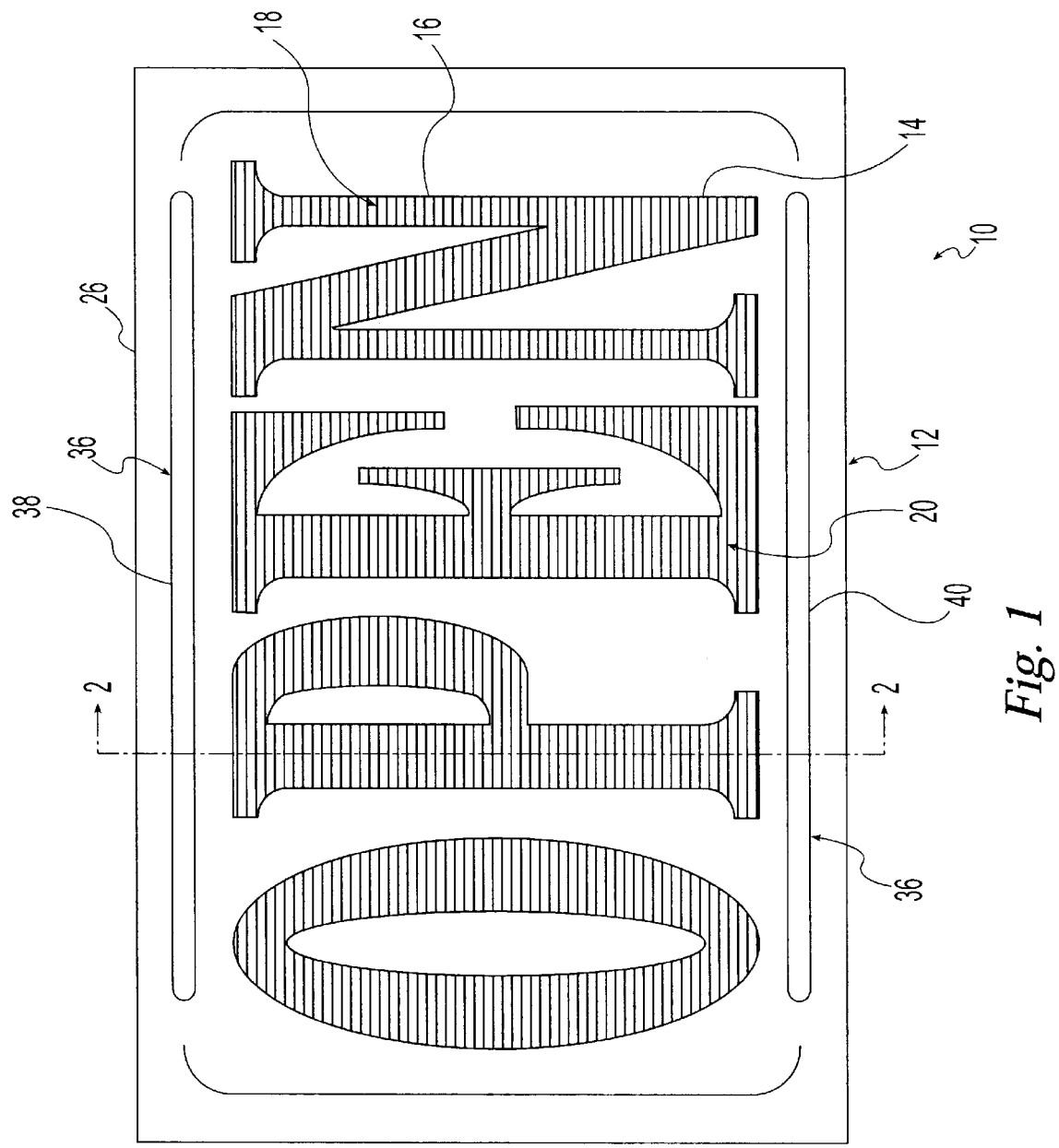
FIG. 1 is a front elevational view of a sign panel according to the present invention.
Figure 2:
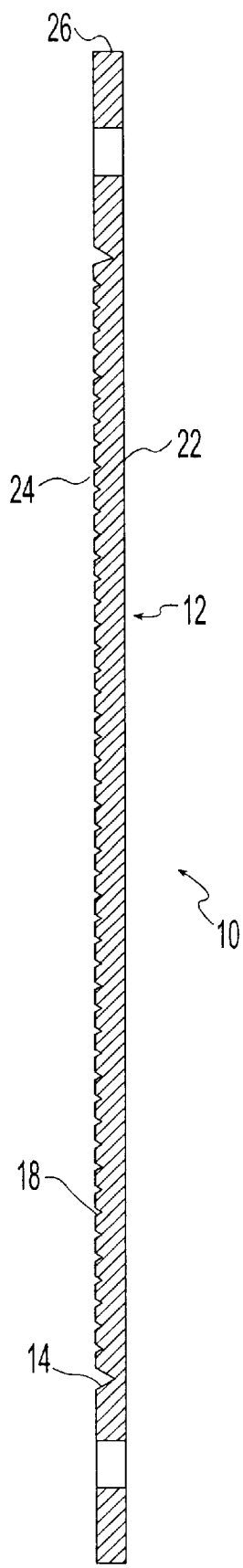
FIG. 2 is a cross-sectional view of the sign panel of FIG. 1 taken along line 2—2 of FIG. 1.

It should be understood that the appended drawings are not necessarily to scale, presenting a somewhat simplified representation of various preferred features illustrative of the basic principles of the invention. The specific design features of a sign as disclosed herein, including, for example, specific materials, colors, dimensions, orientations, locations, and shapes of the various components, will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the sign display illustrated in the drawings. In general, up or upward refers to an upward direction within the plane of the paper in FIG. 1 and down or downward refers to a downward direction within the plane of the paper in FIG. 1. Also in general, fore or forward refers to a direction out of the plane of the paper in FIG. 1 and aft or rearward refers to a direction into the plane of the paper in FIG. 1.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved sign display disclosed herein. The following detailed discussion of various alternative and preferred embodiments will illustrate the general principles of the invention with reference to a unitary sign panel produce a lighting effect similar to the appearance of a electric neon sign. Other embodiments suitable for other applications will be apparent to those skilled in the art given the benefit of this disclosure. The term "unitary" is used in this specification and the claims to mean a single continuous material formed as a single element or member wherein the material is uniform throughout the member. For example, a "unitary sign panel" is used to describe a sign panel formed by a single continuous sheet of material having no additional layers or coatings of any other materials provided thereon. The term "transparent" is used in this specification and in the claims to mean capable of transmitting visible light sufficient to provide perception of distinct images of objects therethrough. The term "translucent" is used in this specification and in the claims to mean capable of transmitting visible light but causing sufficient diffusion to eliminate perception of distinct images of objects therethrough. The term "opaque" is used in this specification and in the claims to mean capable of absorbing, dispersing, and/or reflecting light but not capable of transmitting visible light therethrough. The term "obscured" is used in this specification and the claims to mean to have altered the optical transmissivity by mechanical or chemical means.

Referring now to the drawings, FIGS. 1 to 4 illustrates a sign panel 10 according to a preferred embodiment of the present invention. The sign panel 10 includes a transparent sheet or panel 12, grooves 14 formed in the panel to form outlines 16 of desired indicia, and additional grooves 18 formed in the panel to provide hatch patterns 20 within the outlines 16. The transparent sheet 12 is a substantially flat having opposed forward and rearward surfaces 22, 24. The forward surface 22 is generally smooth while the rearward surface 24 has the grooves 14 and the additional grooves 18 provided therein. The illustrated sheet 12 is rectangularly-shaped but other suitable shapes can be utilized.

The transparent sheet 12 can be a glass or sheet plastic sheet such as LEXAN, ACRYLIC, PLEXIGLASS, LUCITE, or the like. The transparent sheet 12 is preferably a phosphorescent plastic sheet such as a phosphorescent acrylic sheet. A suitable phosphorescent plastic sheets is POLYCAST available from the Spartech Corporation of Clayton, Mo. The transparent sheet 12 can be clear or tinted with dye to provide a variety of colors including, red, orange, yellow, green, gold, blue etc. The sheet 12 has a thickness sufficient that the sheet 12 is substantially transparent and sufficient for viewing through the sheet 12 in the direction perpendicular to the forward and rearward planar surfaces 22, 24 of the sheet 12. The forward and rearward surfaces 22, 24 of the sheet 12 are preferably free of opaque coatings or materials such that light is transferable through the sheet 12 in a direction perpendicular to the forward and rearward planar surfaces 22, 24 of the sheet 12 and more preferably free of any coatings or materials so that the sign panel 10 is of unitary construction. The sheet 12 should also have a thickness which provides necessary structural support. The sheet 12 preferably has a thickness which is sufficient to capture ambient light entering edges 26 of the sheet 12 to provide a light conduit. The sheet thickness is preferably in the range of about 0.09 inches to about 1.5 inches and more preferably is about 0.25 inches.

The grooves 14 are cut in the rearward surface 24 of the sheet 12 to form the outlines 16 of the indicia which is visible from the forward planar surface 22 of the sheet 12. The grooves 14 have a depth which is sufficient to refract light transmitted through the plane of the sheet 12 and sufficient to trap and refract light transmitted laterally through the sheet 12. It is noted that while the illustrated embodiment utilizes continuous grooves 14 to form the outlines 16, interrupted or multiple grooves can be utilized within the scope of the present invention. It is also noted that while a single groove 14 is utilized to form each of the outlines 16, multiple spaced apart grooves can be utilized within the scope of the present invention.

Figure 3:
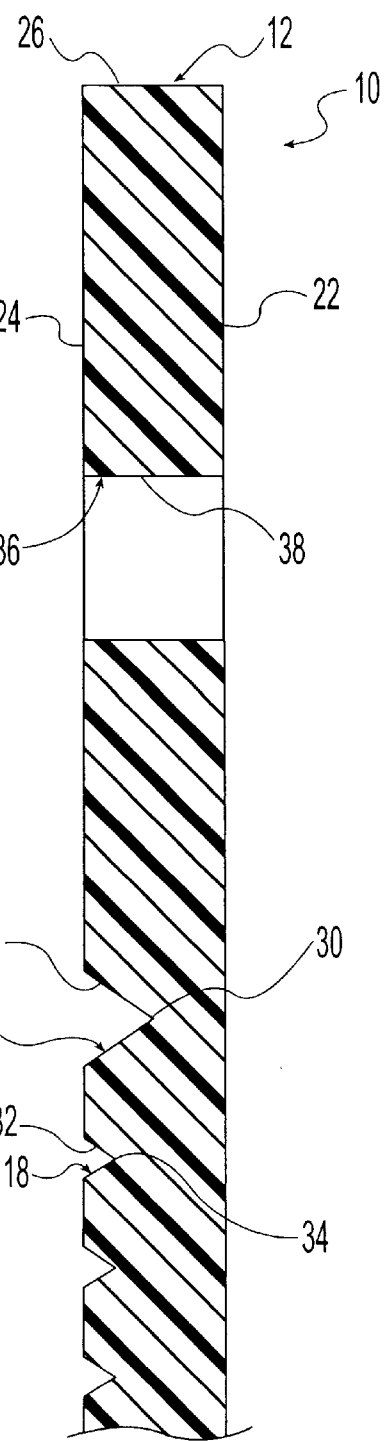
FIG. 3 is an enlarged fragmented view showing a portion of the sign panel of FIG. 2.
Figure 4:
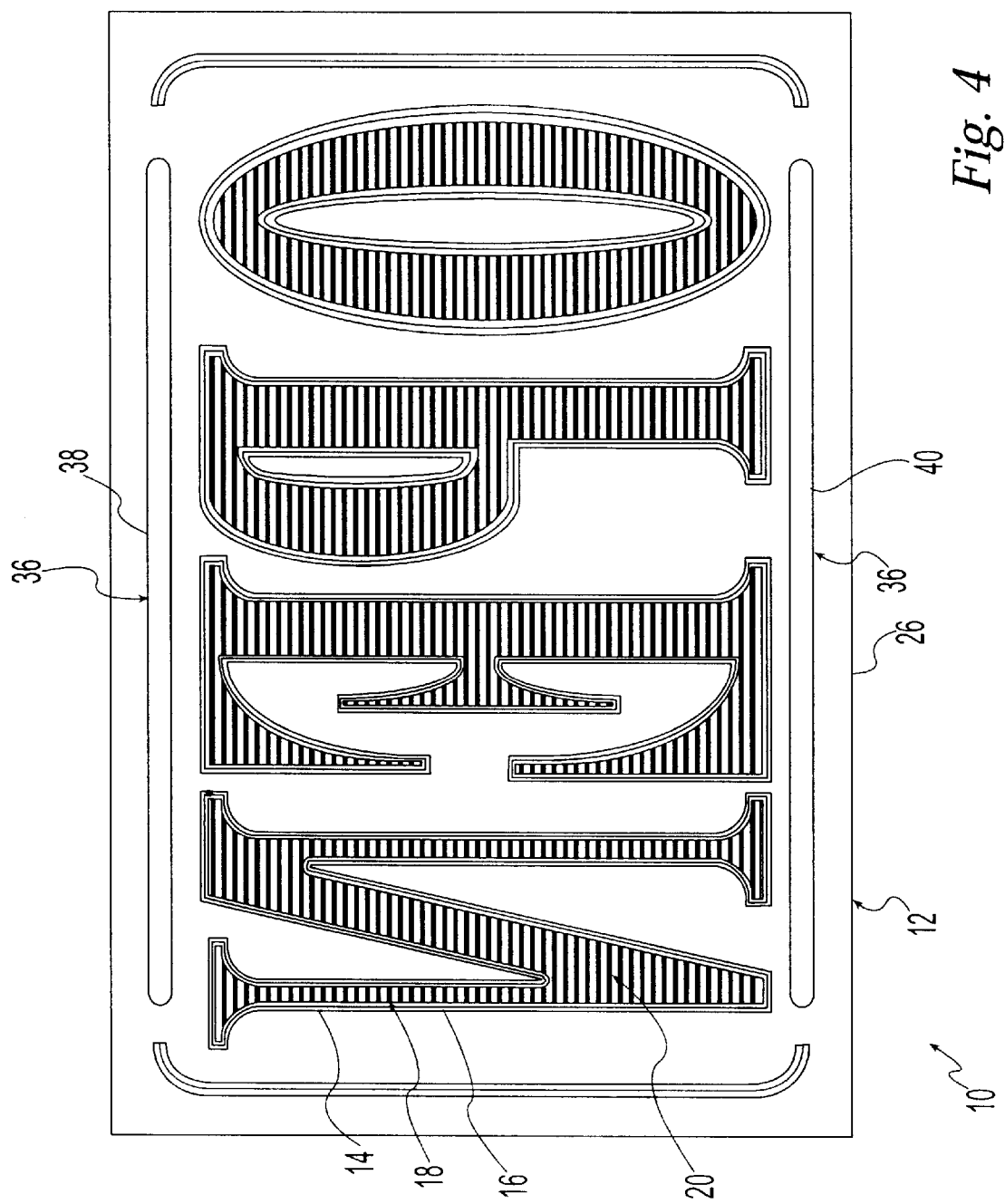
FIG. 4 is a rear elevational view of the sign panel of FIG. 1.
Figure 5:
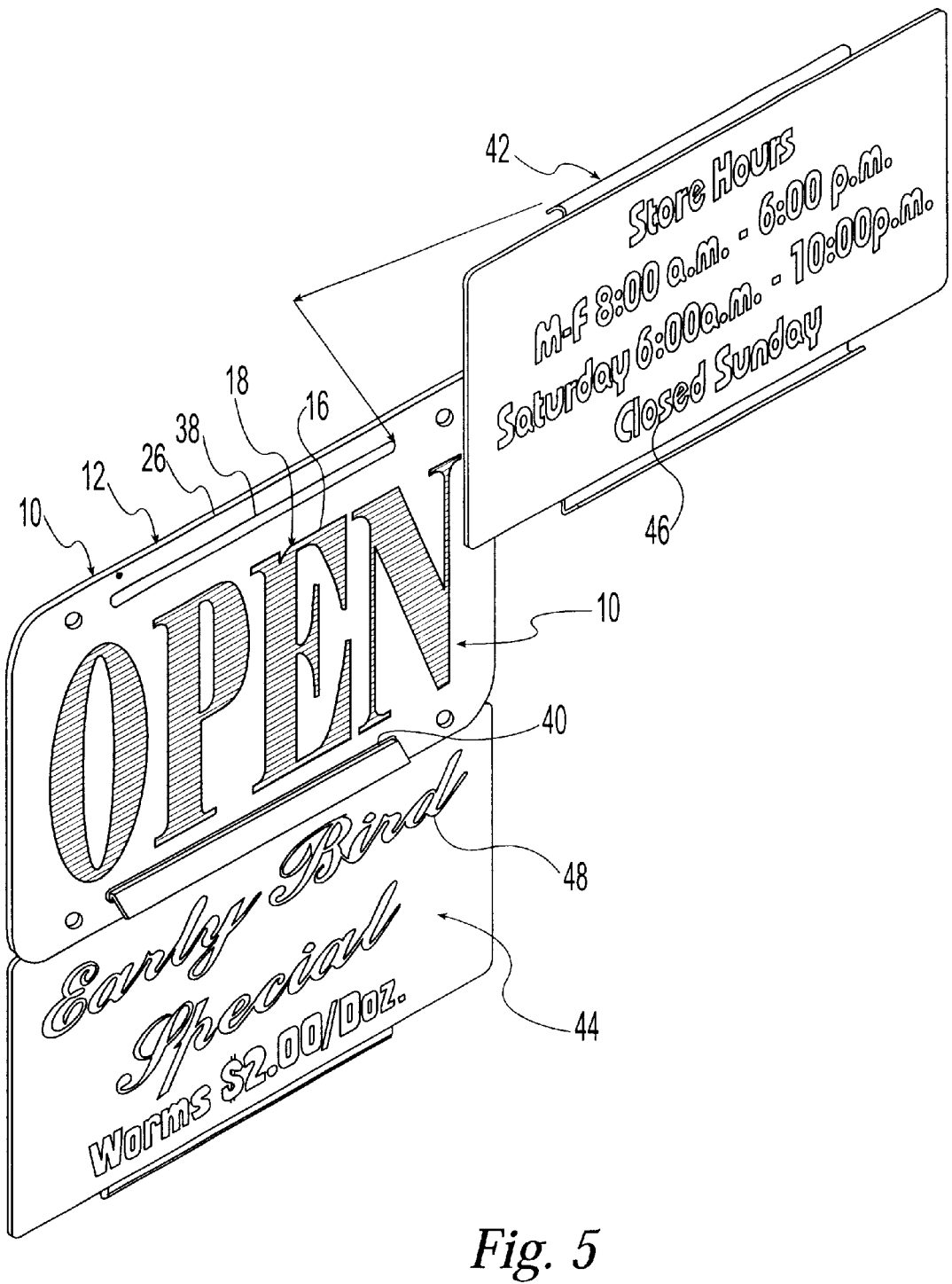
FIG. 5 is a perspective view of the sign panel of FIG. 1 with additional attachment signs.

As best shown in FIG. 3, the illustrated grooves 14 are V-shaped in cross-section having a pair of straight side walls 28 which meet at an apex 30. Preferably, the side walls 28 of the grooves 14 are separated by an angle between about 20 degrees and about 90 degrees. While the V-shaped grooves 14 are preferred, it is noted that the grooves 14 can alternatively have other shapes such as, for example, curved, semicircular, rounded-over, roman ogee, beading, or the like. The grooves 14 preferably have a depth in the range of about ¼ of about ¾ the thickness of the sheet 12 and more preferably about ½ the thickness of the sheet 12 but other depths can be utilized to achieve differing lighting effects. The illustrated grooves 14 have a depth of about 0.125 inches with a panel thickness of about 0.25 inches.

The indicia formed by the outlines 16 can be of any desired shape. For example, the indicia can be alphanumeric characters, graphic designs or images, or the like. The illustrated indicia are the separate letters "O", "P", "E", and "N" to form the word OPEN.

The additional grooves 18 are also cut in the rearward surface 22 of the sheet 12 to form the hatch pattern 20 within the outlines 16 of the indicia which is visible from the forward planar surface 22 of the sheet 12. The hatch pattern 20 makes the indicia more highly visible. The additional grooves 18 have a depth which is sufficient to refract light transmitted through the plane of the sheet 12 and sufficient to trap and refract light transmitted laterally through the sheet 12. The hatch pattern 20 can be of any desired type to highlight the indicia formed by the outlines 16. The illustrated hatch pattern 20 is formed by a plurality of straight, parallel, horizontal, equally sized, and equally spaced-apart additional grooves 18. It is noted that alternative hatch patterns 20 can be formed by, for example, vertical, angled, curved, unequally spaced-apart, unequally sized and/or non-parallel additional grooves 18 depending on the effect desired. While the illustrated embodiment utilized the additional grooves 18 to highlight the indicia, it is noted that the additional grooves 18 can be eliminated within the scope of the present invention depending on the desired lighting effect.

As best shown in FIG. 3, the illustrated additional grooves 18 are also V-shaped in cross-section having a pair of straight side walls 32 which meet at an apex 34. Preferably, the side walls 32 of the additional grooves 18 are separated by an angle between about 20 degrees and about 90 degrees.

While the V-shaped additional grooves 18 are preferred, it is noted that the additional grooves 18 can alternatively have other shapes such as, for example, curved, semicircular, rounded-over, roman ogee, beading, or the like and can have a shape different than the grooves 14. The additional grooves 18 preferably have a depth in the range of about ¼ of about ¾ the thickness of the sheet 12 and more preferably about ½ the thickness of the sheet 12 but other depths can be utilized to achieve differing lighting effects. The additional grooves 18 also preferably have a depth which is less than the grooves 14 forming the outlines 16 but the additional grooves 18 alternatively can have the same depth or a greater depth. The illustrated additional grooves 18 have a depth of about 0.06 inches wile the grooves 14 have a depth of about 0.125 inches with a panel thickness of about 0.25 inches.

The sheet 12 is preferably substantially translucent at the grooves 14 and the additional grooves 18 by obscuring the transparent material of the sheet 12 at those locations. This effect can be easily provided by engraving the grooves 14 and the additional grooves 18. When the grooves 14 and the additional grooves 18 are V-shaped as in the preferred embodiment, engraving also provides the advantage that the apex 30, 34 of the grooves 14 and the addition grooves 18 is substantially opaque which provides a very pleasing visual effect.

The sheet 12 receives ambient light from the environment and as a result of refraction at the grooves 14, the indicia formed by the grooves 14 becomes illuminated so that the outline 16 of the indicia is highly visible. The ambient light also refracts at the additional grooves 18, albeit to a lower level when the additional grooves 18 have a smaller depth, to illuminate the hatch pattern 20 and highlight the indicia to a desired degree. It is noted that the ambient light can be directed toward the sign panel 10 from any direction including directly toward the forward surface 22 and/or the rearward surface 24. It should be appreciated that under direct sunlight, the sign panel 10 is more visible than either neon or edge-lit signs. It has been found that the sign panel 10 can be between two and three times more visible than neon signs during daylight hours.

The sign panel 10 is preferably provided with means of attachment 36 for securing the sign panel 10 to a support structure. The illustrated sheet 12 is provided with upper and lower elongated openings or slots 38, 40. The illustrated slots 38, 40 extend generally horizontal and are located adjacent the upper and lower edges 26 of the sheet 12. It is noted that other shapes and types of attachment means 36 can be utilized within the scope of the present invention.

Figure 6:
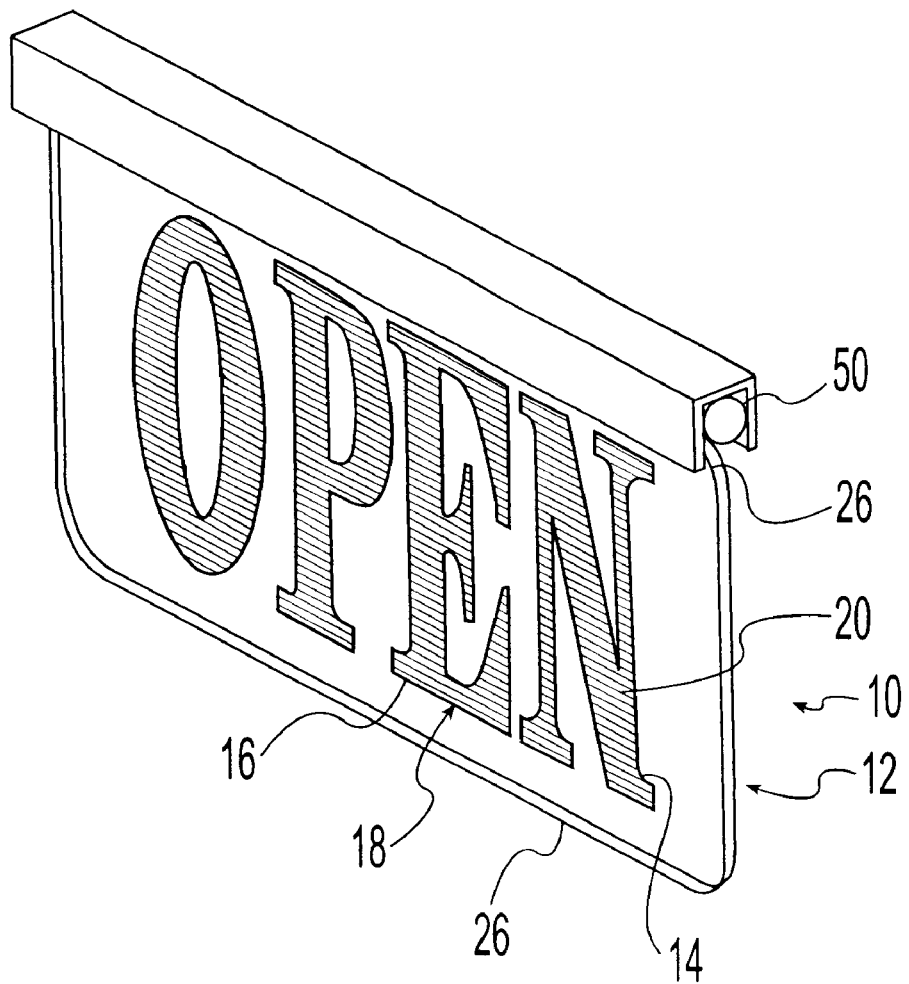
FIG. 6 is a perspective view of the sign panel of FIG. 1 wherein an artificial light source light source is provided.

FIG. 6, illustrates that additional attachment signs 42, 44 can be supported by the sign panel 10. An upper attachment sign 42 can be hung from or supported by the upper slot 38 so that it substantially covers the sign panel 10. Preferably, the upper attachment sign 42 is opaque so that the sign panel 10 is not visible therethrough. The upper attachment sign 42 can be provided with any desired indicia 46 such as the illustrated "CLOSED" or can be blank. A lower attachment sign 44 can be hung from or supported by the lower slot 40 so that the lower attachment sign 44 is disposed parallel to and below the sign panel 10. The lower attachment sign 44 can be made of any desired material and can be transparent, translucent, or opaque and can be provided with write-on-wipe-off self adhesive vinyl or other signage or indicia 48 as desired.

FIG. 6, illustrates the sign panel 10 wherein active lighting is provided. The unitary sign panel 10 is substantially the same as described hereinabove with regard to the passive lighting embodiment except that a light source 50 providing artificial light is used to illuminate the sign panel 10. The light source 50 can be of any suitable type such as, for example, a halogen lamp, a fluorescent tube, LED, or the like. The light source 50 is preferably disposed along the edge 26 of the sheet 12. The illustrated light source 50 is disposed along the top edge 26 of the sheet 12. It is noted that alternatively the light source 50 can be disposed along a different edge 26 of the sheet 12 and/or multiple light sources 50 can be provided along one or more edges 26 of the sheet 12. In this active lighting embodiment, the sheet 12 receives light from the light source 50 both through the top edge 26 of the sheet and along both the rearward and forward surfaces 22, 24 to improve the illumination of the indicia formed by the grooves 14 and the additional grooves 18. This active lighting embodiment is particularly suited for rare applications wherein sufficient ambient light is not available.

From the foregoing disclosure and detailed description of certain preferred embodiments, it is apparent that various modifications, additions and other alternative embodiments are possible without departing from the true scope and spirit of the present invention. For instance, it will be desirable in some designs to sand blast, or alter other abrasive means, the area occupied within the outlines 16 of the drawings to achieve a broadlyobscured translucent area. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A sign panel comprising, in combination:

a transparent plastic sheet, the sheet having opposed forward and rearward planar surfaces, grooves in the rearward planar surface of the sheet to form outlines of desired indicia viewable at the forward planar surface of the sheet;

wherein the forward and rearward surfaces of the sheet are free of opaque materials such that light is transferable through the sheet in a direction perpendicular to the forward and rearward planar surfaces of the sheet; and wherein the transparent plastic sheet is a transparent phosphorescent plastic sheet.

2. The sign panel according to claim 1, wherein the sheet comprises transparent phosphorescent Acrylic sheet.

3. The sign panel according to claim 1, wherein the sheet has a thickness sufficient for viewing through the sheet in the direction perpendicular to the forward and rearward planar surfaces of the sheet.

4. The sign panel according to claim 1, wherein the desired indicia includes alphanumeric characters.

5. The sign panel according to claim 1, wherein the sheet is of unitary construction and free of materials at the forward and rearward planar surfaces.

6. The sign panel according to claim 1, further comprising additional grooves in the rearward planar surface forming hatch patterns within the outlines of the selected indicia which are viewable from the forward planar surface of the sheet.

7. The sign panel according to claim 1, further comprising an artificial light source disposed at an edge of the sheet.

8. A sign panel comprising, in combination:

a transparent plastic sheet, the sheet having opposed forward and rearward planar surfaces;

grooves in the rearward planar surface of the sheet to form outlines of desired indicia viewable at the forward planar surface of the sheet, wherein the forward and rearward surfaces of the sheet are free of opaque materials such that light is transferable through the sheet in a direction perpendicular to the forward and rearward planar surfaces of the sheet;

wherein the grooves are V-shaped in cross-section; and wherein the grooves are formed by engraving such that the sheet is substantially translucent at the grooves and the sheet is opaque at an apex of the V-shaped grooves.

9. A sign panel comprising, in combination:

a sheet, the sheet having opposed forward and rearward planar surfaces;

grooves in the rearward planar surface of the sheet to form outlines of desired indicia viewable from the forward planar surface of the sheet;

additional grooves in the rearward planar surface forming hatch patterns within the outlines of the selected indicia which are viewable from the forward planar surface of the sheet;. and wherein the sheet is a transparent phosphorescent plastic sheet.

10. The sign panel according to claim 9, wherein the additional grooves have a depth less than a depth of the grooves.

11. The sign panel according to claim 9, wherein at least some of the additional grooves are straight, parallel and spaced apart.

12. The sign panel according to claim 9, wherein the forward and rearward surfaces of the sheet are free of opaque materials such that light is transferable through the sheet in a direction perpendicular to the forward and rearward planar surfaces of the sheet.

13. The sign panel according to claim 9, wherein the sheet has a thickness sufficient for viewing through the sheet in the direction perpendicular to the forward and rearward planar surfaces of the sheet.

14. The sign panel according to claim 9, wherein the desired indicia includes alphanumeric characters.

15. The sign panel according to claim 9, wherein the sheet is of unitary construction and free of materials at the forward and rearward planar surfaces.

16. The sign panel according to claim 9, further comprising an artificial light source disposed at an edge of the sheet.

17. A sign panel comprising, in combination:.

a sheet, the sheet having opposed forward and rearward planar surfaces:

grooves in the rearward planar surface of the sheet to form outlines of desired indicia viewable from the forward planar surface of the sheet;

additional grooves in the rearward planar surface forming hatch patterns within the outlines of the selected indicia which are viewable from the forward planar surface of the sheet;

wherein the grooves are V-shaped in cross-section: and wherein the grooves are formed by engraving such that the sheet is substantially translucent at the grooves and the sheet is opaque at an apex of the V-shaped grooves.

18. A unitary sign panel comprising, in combination:

a transparent phosphorescent plastic sheet, the sheet having opposed forward and rearward planar surfaces;

grooves in the rearward planar surface of the sheet to form outlines of desired indicia viewable from the forward planar surface of the sheet;

additional grooves in the rearward planar surface forming hatch patterns within the outlines of the selected indicia which are viewable from the forward planar surface of the sheet;

wherein the unitary sign panel is free of materials at the forward and rearward surfaces of the sheet such that light is transferable through the sheet in a direction perpendicular to the forward and rearward planar surfaces of the sheet;

wherein the sheet has a thickness sufficient for viewing through the sheet in the direction perpendicular to the forward and rearward planar surfaces of the sheet; and wherein the grooves and the additional grooves are each V-shaped in cross-section.

19. The unitary sign panel according to claim 18, wherein the additional grooves have a depth less than a depth of the grooves.

20. The unitary sign panel according to claim 18, wherein the grooves are formed by engraving such that the sheet is substantially translucent at the grooves and is opaque at an apex of the V-shaped grooves.

21. The unitary sign panel according to claim 18, further comprising an artificial light source disposed at an edge of the sheet.

* * * * *